3,271,354
PIGMENT PREPARATIONS FOR THE COLORATION OF PLASTIC MASSES
Josef Weissert, Viktor Schönbach, and Ferdinand Memmel, Frankfurt am Main, Germany, assignors to Farbwerke Hoechst Aktiengesellschaft vormals Meister Lucius & Brüning, Frankfurt am Main, Germany, a corporation of Germany
No Drawing. Filed Dec. 27, 1962, Ser. No. 247,484
Claims priority, application Germany, Jan. 4, 1962, F 35,709
6 Claims. (Cl. 260—41)

When coloring plastic masses with pigment dyestuffs it is necessary, in order to obtain a uniform coloration and a utilization as full as possible of the coloring strength of the pigment dyestuffs, that the pigments be well dispersed in the mass to be colored.

For coloring plastic masses, the pigment dyestuffs have hitherto mostly been used in the form of powders. This method, however, does not always result in a good dispersion of the dyestuffs. Besides, this method of working involves further drawbacks such as losses of dust and physiological trouble by the dyestuff dust. Therefore, many attempts have been made to prepare the pigments, for example, by incorporating them in suitable liquid, pasty or solid carrier substances so as to reach both a good dispersion in the plastic mass to be colored and an improvement of the technical handling such as non-dusting, and easy dosing.

There is known, for example, a process for coloring polyvinyl chloride wherein the wet press cakes of pigment dyestuffs are mixed with aqueous dispersions of polymers of unsaturated organic acids and, after removal of the water, the mixtures obtained are incorporated in the polyvinyl chloride. This process includes the drawback that it requires a great amount of apparatus and involves additional expenses of energy due to the necessary evaporation of the water from the preparations.

For coloring polyvinyl chloride pigment dyestuffs have already been used in the form of pastes. This process requires in each case a considerable proportion of liquids, for example, plasticizers in order to obtain homogeneous pastes. In this case, the dyestuff content of the paste cannot exceeed 40% by weight.

For coloring caoutchouc, pigment dyestuff preparations with factis, petroleum jelly, wool fat and similar substances or with oily butadiene polymers are already known. Even in these cases great difficulties are involved. The pigment concentrates with the carrier substances mentioned first which, besides, can be prepared with relatively low pigment proportions and are stable for quite a short time only, have a tendency, when incorporated in caoutchouc, to smearing of and adhesion to the roller so that the pigment preparations can be absorbed by the sheet with difficulty and in an insufficient manner only. Furthermore, the preparations often cause tearing of the sheet and, consequently, disturbances in the further treatment. The use of oily butadiene polymers as carrier substance involves a strong and troublesome odor which necessitates the use of special ventilation apparatus. A further disadvantage of the preparations obtained therewith is their relatively soft structure which prevents the subsequent treatment to obtain the desired granular form.

Furthermore, pigment dyestuff concentrates have already been made with the use of solid carrier substances such, for example, as high and low pressure polyethylene, acrylonitrile and vinyl polymers or other artificial or natural resins. In this case, indeed, certain advantages can be achieved by granulating the concentrates. However, these preparations do in other respects not always meet the requirements of industry. Thus, with the carrier substances hitherto known a satisfactory dispersion of the dyestuff cannot be achieved or with great difficulty only when the concentrates are incorporated in plastic masses. Consequently, an insufficient utilization of the tinctorial strength of the pigment dyestuffs is only achieved and colorations are often obtained which are not uniform and streaky. Besides, the pigment dyestuff proportion of the concentrates of up to 50% by weight is in most cases relatively low. Moreover, in many of these known processes it is necessary that solvents are used in the production of the pigment preparations thus producing liquid mixtures first in order to obtain preparations having a high proportion of pigment and a sufficiently fine dispersion of the pigments.

British specification No. 879,587 relates to pigment preparations containing amorphous polypropylene as carrier substance. These preparations which can also be produced in the form of granules are very well suitable for coloring natural and synthetic caoutchouc or polyvinyl chloride, however, they do not always meet the requirements when polyalkylenes and other plastic masses are colored therewith. The dispersion of the pigments in one and the same medium but at different working temperatures is not always equally satisfactory. Thus, these preparations do no longer meet in all cases the increased requirements of practice.

Now we have found that in comparison with the preparations known from the afore-mentioned British specification improved pigment preparations having a high proportion of pigment, a good coloring strength and the ability of being granulated can be obtained by using as carrier substance for the pigment dyestuffs a mixture of amorphous polypropylene and an ethylene-propylene copolymer.

As ethylene-propylene copolymers are generally used those which have a propylene content of about 30 to 50 mol percent, preferably 32 to 36 mol percent. There are especially used ethylene-propylene copolymers which have a reduced specific viscosity of about 2 to 4, preferably 2.6 to 2.9—measured in a 0.1% solution in decahydronaphthalene at 135° C. in a capillary viscosimeter—and a crystallinity of 0 to about 5%, preferably 1 to 2%, and which are characterized by a Defo hardness of about 300 to 1200, preferably 450 to 900—determined at 80° C. according to DIN (German Industrial Standard) 53514. They can further be distinguished by Mooney viscosities ML-4 (100° C.) of about 30 to 70, preferably 41 to 53—determined in the shearing disc viscometer by Mooney according to ASTM D 927–57 T.

As amorphous polypropylene there are particularly used polypropylene waxes having intrinsic viscosities of $$[\eta] \lim_{c \to 0} \frac{\eta \text{ spec.}}{c} = 0.2\text{--}0.5 \text{ cm.}^3/\text{g}$$

and a crystallinity of 0 to about 15% preferably 1 to 5%.

As pigments there may be used the known inorganic and organic pigments such, for example, as carbon black, metal powder, titanium dioxide, ferric hydrates, ultramarine blue and other oxidic or sulfidic inorganic pigments, furthermore, organic pigments such as azo-pigments, water-insoluble vat, phthalocyanine, bisoxazine, quinacridone and perylene-tetracarboxylic acid dyestuffs which are known for example from U.S. Patents 2,844,-484, 2,844,581 and 2,844,485. By azo pigments there are understood azo dyestuffs which are obtained by coupling the diazo or tetraazo compounds of amines free from groups rendering solubility in water with coupling components generally used in pigment chemistry. As coupling components there may be mentioned by way of example naphthols, oxynaphthoic acid arylides, pyrazolones, acetoacetic acid arylides and the like. When these dyestuffs contain sulfonic acid or carboxylic acid groups, they may be used in the form of the color lakes prepared with salts of alkaline-earth metals.

The pigment content of the preparations may vary and may be adjusted to the specific requirements. In general, a pigment dyestuff content as high as possible is desired. With the carrier substances used in the present invention, there can be produced preparations having a pigment content of up to about 75 percent by weight. The obtainable maximum concentration of the pigment dyestuff in the preparations is first of all depending upon the pigment dyestuff used. In general, the pigment content of the preparations is within the range of about 40 to 75% by weight, preferably between 60 and 65% by weight. The proportion of the carrier substances in the preparations is consequently between about 60 to 25% by weight, preferably 40 to 35% by weight. It is of course quite possible to provide for a lower pigment proportion of the preparations, however preparations having a pigment proportion of less than 40% by weight are of no importance in practice since, in general, the highest possible pigment proportion is aspired to. Preparations having pigment proportions exceeding 75% by weight will practically not be used since with higher concentrations a good dispersion of the pigments is no longer guaranteed.

The pigment preparations are produced by simply incorporating the dry pigments in the carrier substances on the apparatus generally used for this purpose, for example, kneading machine, roller mill and the like. The pigment dyestuffs which may be used in the form of dry pieces or powder or incorporated in the carrier substances until a homogeneous mixture is formed. After complete absorption of the dyestuff, the mixture is suitably after-kneaded for some time. The kneading temperature can be raised to about 100° C., it is adjusted to the specific conditions. The incorporation of the pigments in the carrier substances by kneading is preferably carried out at a temperature ranging from about 50° C. to about 80° C. and the after-kneading is done at a temperature of about 70 to 95° C., the temperature being regulated by cooling or heating from the outside. In principle it is possible to work at a higher temperature provided that the quality of the products is not affected thereby. In general, however, the incorporation is preformed at a temperature as low as possible. It is a particular advantage of the pigment preparations of the present invention that the pigments can already be incorporated without any difficulties at a relatively low temperature and in a short kneading time. The total duration of kneading inclusive the after-kneading is in general about 30 to 90 minutes.

After cooling, the ready mixture mostly obtained in large pieces can be easily comminuted in known manner, for example by working it up in cutting mills, if desired with the addition of small amounts of talc, to obtain pieces ready for use, preferably granules of any size. In this form the pigment preparations can be incorporated in the plastic masses to be colored. The granular form involves the technical advantages desired in practice i.e. the products do not dust, they can be easily dosed, have a high content of pigment and tinge the plastic masses in a uniform manner with full utilization of the coloring strength and good dispersion of the pigments.

A substantial advantage of the pigment preparations of the present invention is the possibility to adjust the most favorable kneading viscosity of the carrier material for each pigment dyestuff by selecting the ratio of ethylene-propylene copolymer to amorphous polypropylene. The proportion of the two components of the carrier material may vary within wide limits. In general a mixing proportion ranging from about 10 to 95 percent by weight of ethylene-propylene copolymer to about 90 to 5 percent by weight of amorphous polypropylene is maintained. There are preferably used mixtures of 40 to 80 parts by weight of ethylene-propylene copolymer and 60 to 20 parts by weight of amorphous polypropylene.

The pigment preparations of the present invention have proved to be very well suitable for coloring plastic masses of different kind such, for example, as hard and soft polyvinyl chloride, high and low pressure polyethylene, polypropylene, polystyrene, polyvinyl acetate, natural and synthetic caoutchouc, no difference practically existing in the suitability of the present preparations. The possibility of using the preparations for plastic masses of different kind is of great technical importance. The present preparations are in this point superior to the known pigment preparations. While the known preparations are always provided for coloring specific plastic masses and have certain disadvantages when they are applied to other supports, the present preparations can be used, without any difference, for coloring plastic masses of different kind. The colorations obtained therewith are distinguished from those obtained with pigment dyestuff powders by a superior intensity and purity. This is obviously caused by the extremely fine dispersion of the pigments in the carrier substance.

The suprisingly good stability of the present pigment preparations has a very favorable effect regarding influences from the outside such as high temperatures or atmospheric oxygen. Thus, the stability in storage of the present preparations is distinctly superior to that of other pigment preparations. Another advantage of the new preparations resulting from their good resistance to temperature influences is that they can be incorporated in the plastic masses to be colored in a wide temperature range. This advantage is particularly valuable with the modern high capacity kneading machines in which relatively high working temperatures exist. Thus, for instance, the pigment dyestuffs are incorporated by kneading in caoutchouc masses at a temperature up to 120° C., in polyvinyl chloride at a temperature up to 180° C. and in polyethylene at a temperature up to 260° C. Within these temperature ranges the present preparations can be used without any difficulty and impairment of the coloring strength. In contradistinction thereto, substantial differences in the quality of the colorations depending upon the working temperature are found with the known pigment preparations. A distinct decrease of the coloring strength can be observed at high temperatures, often at a temperature above 100° C. already.

The following examples serve to illustrate the invention but they are not intended to limit it thereto, the parts being by weight unless otherwise stated.

*Example 1*

75 parts of an ethylene-propylene copolymer having a Defo hardness of 900 and 30 parts of a polypropylene wax having a reduced specific viscosity of 0.5 and a crystallinity of 2% were kneaded, while gently heating in a divided trough kneader, until the mass became homogeneous and the temperature had risen to about 80° C. 195 parts of a coupling product from 1 mol of 3,3'-dichloro-4,4'-diamino-diphenyl and 2 mols of acetoacetyl-1-amino-2,4-dimethylbenzene in the form of a powder were then incorporated in the masses in 4 equal portions by kneading. The kneading took about 15 to 20 minutes. The masses was then after-kneaded for about 1 hour while allowing the temperature to sink to about 70° C. Since the mass did not stick to the walls, the kneaded could be easily emptied. After cooling, the mass was coarsely comminuted in a cutting mill. A granular substance was thus obtained which was equally well suitable for coloring natural and synthetic caoutchouc and polyvinyl chloride, high pressure and low pressure polyethylene, and also polypropylene and polystyrene.

*Example 2*

75 parts of the ethylene-propylene copolymer used in Example 1 and 30 parts of the amorphous polypropylene used in Example 1 were kneaded in a divided trough kneader, while gently heating, until the mass became homogeneous and the temperature had risen to about 80° C. 195 g. of a coupling product from 1 mol of 3,3'-dichloro-4,4'-diamino-diphenyl and 2 mols of 1-phenyl-3-methyl-5-pyrazolone in the form of a powder were then incorporated in the mass in 4 equal portions by kneading for about 15 minutes. The mass was then after-kneaded for about a further 15 minutes. The kneader was emptied and the kneaded mass was treated as described in Example 1. The granular substance thus obtained colored rubber and plastic masses full orange tints possessing an excellent fastness and particularly a resistance to temperatures up to 120° C. in rubber and up to 260° C. in polyethylene.

*Example 3*

65 parts of the ethylene-propylene copolymer cited in Example 1 and 40 parts of the amorphous polypropylene also cited in Example 1 were kneaded in a divided trough kneader, while gently heating, until the mass was plastic and homogeneous. 195 g. of a coupling product from 1 mol of 1-amino-2-methoxy-benzene-5-carboxylic acid anilide and 1 mol of 2-hydroxy-3-naphthoic acid-2',5'-dimethoxy-4'-chloroanilide in the form of a powder were then incorporated in the mass, in 4 equal portions, by kneading for about 15 to 20 minutes. The mass was then after-kneaded for about the same time. After emptying the kneading machine and coarsely milling the mass in the cutting mill as described in Example 1, a granular substance was obtained which tinged plastic masses such as, for example, hard and soft polyvinyl chloride, high and low pressure polyethylene, polypropylene, polystyrene and natural and synthetic caoutchouc equally good full carmine tints possessing an outsanding fastness. The resistance to heat and the stability in storage of the granular pigment preparations was as good as those of the preparations described in Example 2.

*Example 4*

80 parts of the ethylene-propylene copolymer and 25 parts of the amorphous polypropylene, both described in Example 1, were kneaded in a divided trough kneader, while gently heating, until the mass was homogeneous and had a temperature of about 80° C. 195 g. of calcium lacquer of the coupling product from 1 mol of 1-aminonaphthalene and 1 mol of 1-hydroxy-naphthalene-5-sulfonic acid in the form of a powder were incorporated in the mass in 4 equal portions by kneading for about 20 minutes. The mass was then after-kneaded for a further 15 minutes. After emptying the kneader and cooling, the mass was coarsely milled and a granular substance was obtained which possessed an excellent stability in storage. This preparation colored plastic masses and rubber full claret tints. The colorations were distinguished by a good resistance to temperature influences.

*Example 5*

100 parts of the ethylene-propylene copolymer and 5 parts of the amorphous polypropylene, both described in Example 1, were kneaded in a divided trough kneader while gently heating, until a homogeneous mass had formed. The heating was adjusted so that the temperature amounted to about 60° C. In the mixture of the carrier substances were incorporated in 4 equal portions, while kneading for 10 minutes, 255 parts of barium lacquer of the coupling product from 1 mol of 1-amino-3-methyl-4-chloro-6 sulfonic acid and 1 mol of β-naphthol. The mass was then after-kneaded for about a further 30 minutes. After emptying the kneading machine, the mass was allowed to cool and then comminuted to obtain a granular substance which was very well stable in storage and was suitable for coloring plastic masses and rubber. There were obtained full red colorations possessing a good resistance to temperature influences.

We claim:
1. A method for coloring a plastic mass with a pigment comprising incorporating into said mass a preparation consisting essentially of from 40 to 75% by weight of a pigment and from 25 to 60% by weight of a carrier, said carrier consisting essentially of
   (a) from 10 to 95 weight percent of a copolymer of ethylene and propylene having a propylene content of from 30 to 50 mol percent and
   (b) from 5 to 90 weight percent of amorphous polypropylene having an intrinsic viscosity of

$$[\eta] \lim_{c \to 0} \frac{\eta \text{ spec.}}{c} = 0.2\text{--}0.5 \text{ cm.}^3/\text{g}$$

and a crystalline portion of 0.5 to 15% by weight.

2. A process as defined in claim 1, wherein the pigment preparation contains 60 to 65% by weight of a pigment and 40 to 35% by weight of the carrier substance.

3. A method for coloring a plastic mass with a pigment comprising incorporating into said mass a preparation consisting essentially of from 40 to 75% by weight of a pigment and from 25 to 60% by weight of a carrier, said carrier consisting essentially of
   (a) from 10 to 95 weight percent of a copolymer of ethylene and propylene having a propylene content of from 30 to 50 mol percent which copolymer has a specific viscosity measured as a solution of 0.1% by weight in decahydronaphthalene at 135° C. of 2 to 4, a crystalline portion of 0 to 5% by weight, a Defo-hardness of 300 to 1200 and a Mooney viscosity at 100° C. of 30 to 70 and
   (b) from 5 to 90 weight percent of amorphous polypropylene having an intrinsic viscosity of $$[\eta] \lim_{c \to 0} \frac{\eta \text{ spec.}}{c} = 0.2\text{--}0.5 \text{ cm.}^3/\text{g}$$

and a crystalline portion of 0.5 to 15% by weight.

4. A pigment preparation for coloring a plastic mass consisting essentially of from 40 to 75% by weight of a pigment and from 25 to 60% by weight of a carrier, said carrier consisting essentially of
   (a) from 10 to 95 weight percent of a copolymer of ethylene and propylene having a propylene content of from 30 to 50 mol percent and
   (b) from 5 to 90 weight percent of amorphous polypropylene having an intrinsic viscosity of $$[\eta] \lim_{c \to 0} \frac{\eta \text{ spec.}}{c} = 0.2\text{--}0.5 \text{ cm.}^3/\text{g}$$

and a crystalline portion of 0.5 to 15% by weight.

5. A pigment preparation as defined in claim 4, wherein the pigment preparation contains 60 to 65% by weight of a pigment and 40 to 35% by weight of the carrier substance.

6. A pigment preparation for coloring a plastic mass consisting essentially of from 40 to 75% by weight of a pigment and from 25 to 60% by weight of a carrier, said carrier consisting essentially of
   (a) from 10 to 95 weight percent of a copolymer of ethylene and propylene having a propylene content of from 30 to 50 mol percent which coplymer has a specific viscosity measured as a solution of 0.1% by weight in decahydronaphthalene at 135° C. of 2 to 4, a crystalline portion of 0 to 5% by weight, a Defo hardness of 300 to 1200 and a Mooney viscosity at 100° C. of 30 to 70 and (b) from 5 to 90 weight percent of amorphous polypropylene having an intrinsic viscosity of $$[\eta] \lim_{c \to 0} \frac{\eta \text{ spec.}}{c} = 0.2\text{--}0.5 \text{ cm.}^3/\text{g.}$$

and a crystalline portion of 0.5 to 15% by weight.

References Cited by the Examiner

UNITED STATES PATENTS 3,137,672  6/1964  Lehane _____ 260—41

FOREIGN PATENTS 864,799  4/1961  Great Britain.
879,587  10/1961  Great Britain.
884,142  12/1961  Great Britain.

MORRIS LIEBMAN, *Primary Examiner.*

A. LIEBERMAN, *Assistant Examiner.*